US008611584B2

(12) United States Patent
Teoh et al.

(10) Patent No.: US 8,611,584 B2
(45) Date of Patent: Dec. 17, 2013

(54) SYSTEM AND METHOD FOR PERFORMING OPTICAL NAVIGATION USING PORTIONS OF CAPTURED FRAMES OF IMAGE DATA

(75) Inventors: Edward Teoh, Subang Jaya (MY); Willie Song, Bayan Lepas (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1139 days.

(21) Appl. No.: 12/542,577

(22) Filed: Aug. 17, 2009

(65) Prior Publication Data

US 2011/0038508 A1 Feb. 17, 2011

(51) Int. Cl.
*G06K 9/00* (2006.01)

(52) U.S. Cl.
USPC ........... 382/100; 382/103; 345/156; 345/158; 345/163; 345/166

(58) Field of Classification Search
USPC .......... 382/100, 103; 345/156–158, 162, 163, 345/165, 166
See application file for complete search history.

(56) References Cited

U.S. PATENT DOCUMENTS

| 5,644,139 | A  | * | 7/1997 | Allen et al. | 250/557 |
| 6,222,174 | B1 | * | 4/2001 | Tullis et al. | 250/221 |
| 6,664,948 | B2 | * | 12/2003 | Crane et al. | 382/313 |
| 7,386,183 | B2 | * | 6/2008 | Tamura | 382/260 |
| 7,417,623 | B2 | * | 8/2008 | Lin et al. | 345/166 |
| 7,474,767 | B2 |   | 1/2009 | Sen et al. | |
| 8,090,221 | B2 | * | 1/2012 | Chen et al. | 382/300 |
| 2007/0262243 | A1 | * | 11/2007 | Cheah et al. | 250/214 R |
| 2008/0199078 | A1 |   | 8/2008 | Lam et al. | |

OTHER PUBLICATIONS

James L. Crowley, Francois Berard and Joelle Coutaz, "Finger Tracking as an Input Device for Augmented Reality," Proceedings of the International Workshop on Face and Gesture Recognition, Zurich, Switzerland, Jun. 1995, pp. 1-8.

* cited by examiner

*Primary Examiner* — Eric Rush

(57) ABSTRACT

A system and method for performing optical navigation selectively uses portions of captured frame of image data for cross-correlation for displacement estimation, which can reduce the power consumption and/or increase the tracking performance at higher speed usage.

17 Claims, 8 Drawing Sheets

SYSTEM AND METHOD FOR PERFORMING OPTICAL NAVIGATION USING PORTIONS OF CAPTURED FRAMES OF IMAGE DATA

BACKGROUND OF THE INVENTION

Optical navigation systems operate to estimate movements between the optical navigation systems and navigation surfaces to perform tracking operations. An optical navigation system uses a light source, such as a light-emitting diode (LED) or a laser diode, to illuminate a region of a navigation surface and an image sensor array to receive the light reflected from the navigation surface to successively capture frames of image data of the navigation surface. The optical navigation system compares the successive image frames and estimates the relative movements between the optical navigation system and the navigation surface based on the comparisons between the successive image frames. The comparisons are based on detecting and computing displacements of features in the captured frames of image data, which involve performing cross-correlations on the frames of image data. These cross-correlations are performed by a sensor chip that typically includes the image sensor array.

Optical navigation systems are commonly used in optical computer mice to track the movements of the mice relative to the navigation surfaces on which the mice are manually manipulated. The movements of a computer mouse are used to control a cursor on a monitor of a computer system.

When used in an optical computer mouse, there are various considerations for the design of an optical navigation system. Some of these design considerations include power consumption and tracking speed. As an example, if the optical computer mouse is a wireless mouse powered by batteries, a reduction in power consumption of the optical navigation system is an important consideration for the optical navigation system.

Thus, there is a need for a system and method for performing optical navigation that reduces power consumption and/or increase tracking speed.

SUMMARY OF THE INVENTION

A system and method for performing optical navigation selectively uses portions of captured frame of image data for cross-correlation for displacement estimation, which can reduce the power consumption and/or increase the tracking performance at higher speed usage.

A system for optical navigation in accordance with an embodiment of the invention comprises an image sensor, a feature detector and a cross-correlator. The image sensor has an array of photosensitive elements configured to capture frames of image data of a navigation surface. The feature detector is operably connected to the image sensor to receive a particular frame of image data of the navigation surface. The feature detector is configured to determine whether the particular frame of image data includes a portion with prominent trackable feature. The portion of the particular frame of image data includes fewer pixels than the particular frame of image data. The cross-correlator is operably connected to the feature detector and the image sensor. The cross-correlator is configured to cross-correlate the particular frame of image data with another frame of image data using every pixel of the particular frame of image data and the another frame of image data if the feature detector determines that the particular frame of image data does not include the frame portion with the prominent trackable features. The cross-correlator is further configured to cross-correlate the portion of the particular frame of image data with a corresponding portion of the another frame of image data if the feature detector determines that the particular frame of image data does include the portion with the prominent trackable features. The results of cross-correlation performed by the cross-correlator are used to estimate displacement with respect to the navigation surface.

A method for performing optical navigation in accordance with an embodiment of the invention comprises capturing frames of image data of a navigation surface, determining whether a particular frame of image data of the navigation surface includes a portion with prominent trackable feature, the portion of the particular frame of image data including fewer pixels than the particular frame of image data, cross-correlating the particular frame of image data with another frame of image data using every pixel of the particular frame of image data and the another frame of image data if the particular frame of image data does not include the portion with the prominent trackable features, cross-correlating the portion of the particular frame of image data with a corresponding portion of the another frame of image data if the particular frame of image data does include the portion with the prominent trackable features, and generating displacement values based on the results of the cross-correlating of the particular frame of image data with the another frame of image data or the cross-correlating of the portion of the particular frame of image data with the corresponding portion of the another frame of image data, the displacement values being an estimate of displacement with respect to the navigation surface. In an embodiment, the particular frame of image data may be an N×N pixel frame of image data and the portion of the particular frame of image data may be an M×M pixel portion, where M is less than N.

Other aspects and advantages of the present invention will become apparent from the following detailed description, taken in conjunction with the accompanying drawings, illustrated by way of example of the principles of the invention.

DETAILED DESCRIPTION

Figure 1:
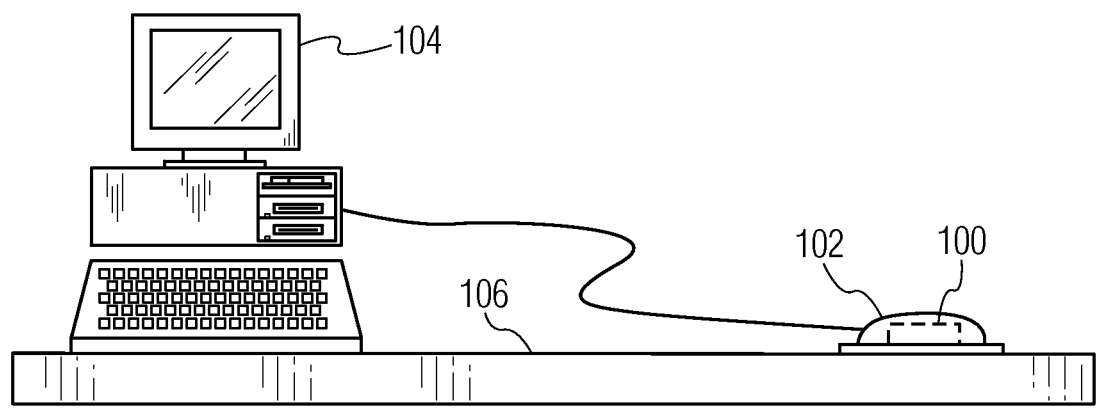
FIG. 1 shows an optical navigation system included in an optical computer mouse in accordance with an embodiment of the invention.

With reference to FIG. 1, an optical navigation system 100 in accordance with an embodiment of the invention is shown.

As shown in FIG. 1, the optical navigation system 100 is included in an optical computer mouse 102, which is connected to a computer 104. In this implementation, the optical navigation system 100 is used to track the movements of the optical mouse 102 as the optical mouse is manipulated over a navigation surface 106 by a user to control a cursor displayed on the computer 104. However, in other implementations, the optical navigation system 100 can be used in different products for various tracking applications. As described in detail below, the optical navigation system 100 is configured to selective use portions of captured frames of image data of the navigation surface 106 for cross-correlation calculations, which can improve the tracking performance, enable faster tracking and/or reduce power consumption of the system.

Figure 2:
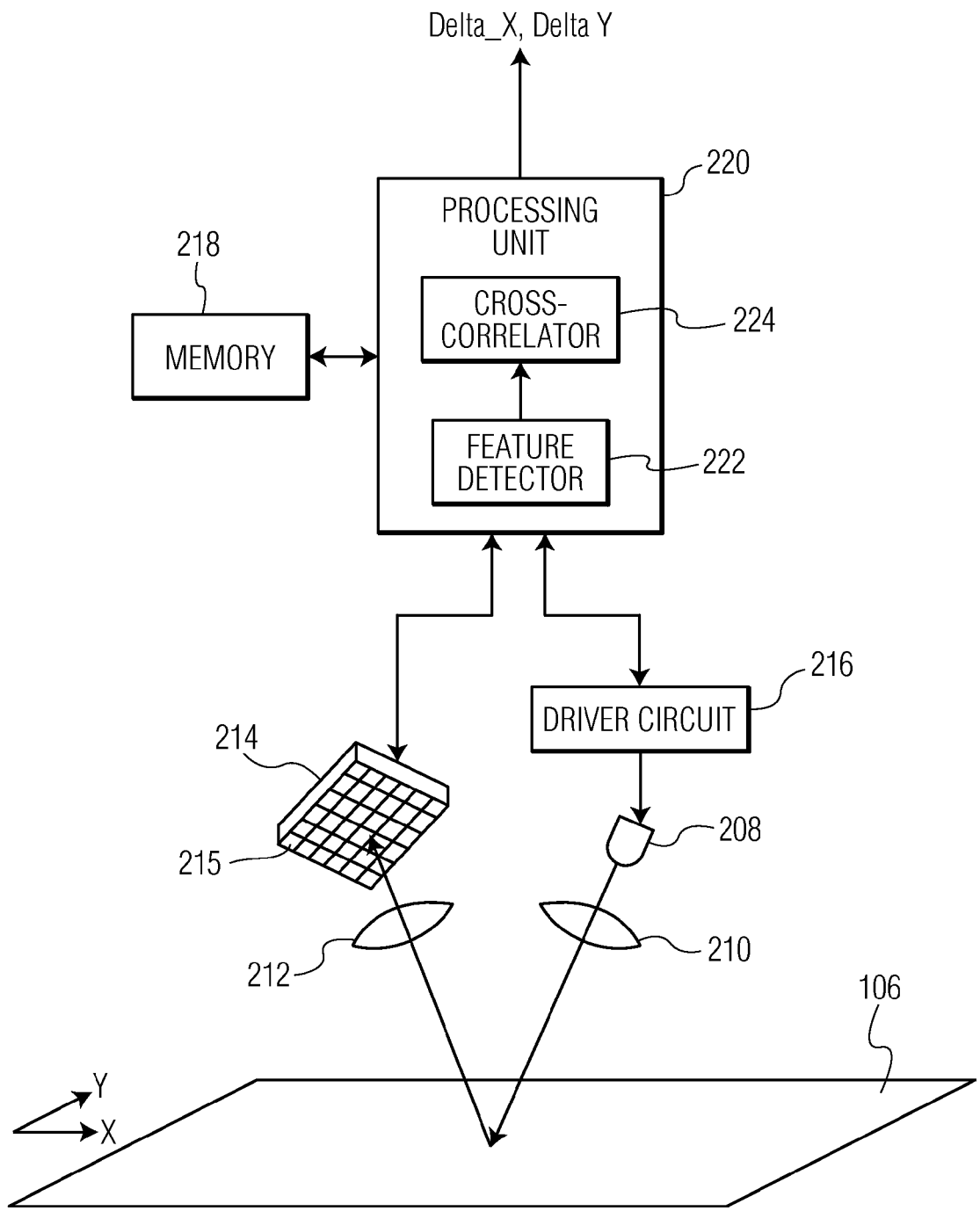
FIG. 2 is a diagram of the optical navigation system in accordance with an embodiment of the invention.

As shown in FIG. 2, the optical navigation system 100 includes a light source 208, a focusing lens 210, an imaging lens 212, an image sensor 214, a driver circuit 216, memory 218 and a processing unit 220. Although these components of the optical navigation system 100 are shown in FIG. 2 as being separate components, some of these components may be integrated. As an example, the image sensor 214, the driver circuit 216, the memory 218 and the processing unit 220 may be integrated into a single integrated circuit chip. In addition, the optical navigation system 100 further includes some common components found in conventional optical navigations systems, such as an analog-to-digital converter and row and column decoders, which are not described herein so that the inventive features of the invention are not obscured.

The light source 208 is configured to generate light in response to an applied driving signal. The light source 208 can be any type of a light emitting device, such as a light-emitting diode or a laser diode. As an example, the light source 208 may be a vertical-cavity surface-emitting laser (VCSEL), which generates a coherent laser beam of light. The light source 208 is activated by the driver circuit 216, which provides driving signals to the light source. The focusing lens 210 is positioned between the light source 208 and the navigation surface 106 to focus the light from the light source onto a region of the navigation surface. In some embodiments of the optical navigation system 100, the focusing lens 210 may not be necessary. The imaging lens 212 is positioned between the navigation surface 106 and the image sensor 214 to focus the light reflected off the navigation surface onto the image sensor.

The image sensor 214 is configured to capture frames of image data of the navigation surface 106 for displacement estimation. The image sensor 214 includes an array of photosensitive pixel elements 215. Each photosensitive pixel element is configured to accumulate an electrical charge in response to incident light. During an exposure period, the photosensitive pixel elements 215 simultaneously accumulate electrical charges in response to light from the navigation surface 106, which are captured as electrical signals at the end of the exposure period. These signals form a frame of image data of the navigation surface 106, which can then be used to estimate any displacement between the optical navigation system 100 and the navigation surface.

The image sensor 214 may be a charged-coupled device (CCD) image sensor, a complementary metal oxide semiconductor (CMOS) image sensor, an ultrasonic device or any device that is capable of producing an image. The number of photosensitive pixel elements 215 included in the image sensor 214 may vary depending on at least the particular application of the optical navigation system 100. As an example, the image sensor 214 may include a 20×20 array of photosensitive pixel elements, which includes a one-pixel thick square frame of dummy photosensitive pixel elements. Thus, in this example, the image sensor includes a 19×19 array of active photosensitive pixel elements. Active photosensitive pixel elements are the pixel elements that are used to capture the electrical signals that form a frame of image data. Consequently, in this example, each frame of image data captured by the image sensor 214 is a 19×19 pixel frame of image data. The frames of image data captured by the image sensor 214 may be stored in the memory 218 to be used by the processing unit 220.

The memory 218 can be any type of read/writable memory, such as random access memory. Although the memory 218 is shown in FIG. 2 to be external to the processing unit 220, the memory 218 may be located within the processing unit in other embodiments.

The processing unit 220 is configured to control the driver circuit 216 and the image sensor 214 in order to capture frames of image data of the navigation surface 106. The processing unit 220 is electrically connected to the driver circuit 216 and the image sensor 214 to provide control signals. The processing unit 220 provides control signals to the driver circuit 216 to direct the driver circuit to apply driving signals to the light source 208 to activate the light source. The processing unit 220 also provides control signals to the image sensor 214 to accumulate electrical charges at the photosensitive pixel elements 215 and integrate at least some of the photosensitive pixel elements to produce each frame of image data of the navigation surface 106. Thus, the processing unit 220 is able to control the frame rate of the optical navigation system 1 00.

The processing unit 220 is also configured to process the captured frames of image data of the navigation surface 106 to estimate any displacement between the optical navigation system 100 and the navigation surface. The process of determining displacements between the optical navigation system 100 and the navigation surface 106 involves correlating a frame of image data of the navigation surface with a subsequently captured frame of image data of the navigation surface.

The processing unit 220 operates in different modes of operations for displacement estimation. In a first mode of operation, the processing unit 220 correlates entire frames of image data for displacement estimation. In a second mode of operation, the processing unit 220 selects a portion of a reference frame of image data of the navigation surface 106 with prominent trackable features and then only correlates that portion of the reference frame of image data with a corresponding portion of a previously captured frame of image data of the navigation surface for displacement estimation, as described in more detail below. The second mode of operations allows the optical navigation system 100 to reduce power consumption and/or to increase tracking speed when operating on navigation surfaces with good trackable features.

The output of the processing unit 220 includes directional delta X displacement values, Delta_X, and directional delta Y displacement values, Delta_Y. Each directional displacement value includes a negative or positive sign information, which indicates direction, and an absolute displacement value, which indicates the amount of displacement in that direction. In a particular implementation, the directional delta X and Y displacement values are generated in the form of two's complement binary numbers.

The processing unit 220 may be a general-purpose digital processor such as a microprocessor or microcontroller. In other embodiments, the processing unit 220 may be a special-purpose processor such as a digital signal processor. In still other embodiments, the processing unit 220 may be another type of controller or a field programmable gate array (FPGA).

As illustrated in FIG. 2, the processing unit 220 includes a feature detector 222 and a cross-correlator 224. In this illustrated embodiment, the feature detector 222 and the cross-correlator 224 are integrated into the processing unit 220. In other embodiments, the feature detector 222 and the cross-correlator 224 may be separate components of the optical navigation system 100. The feature detector 222 and the cross-correlator 224 can be implemented as software, hardware and/or firmware.

Figure 3:
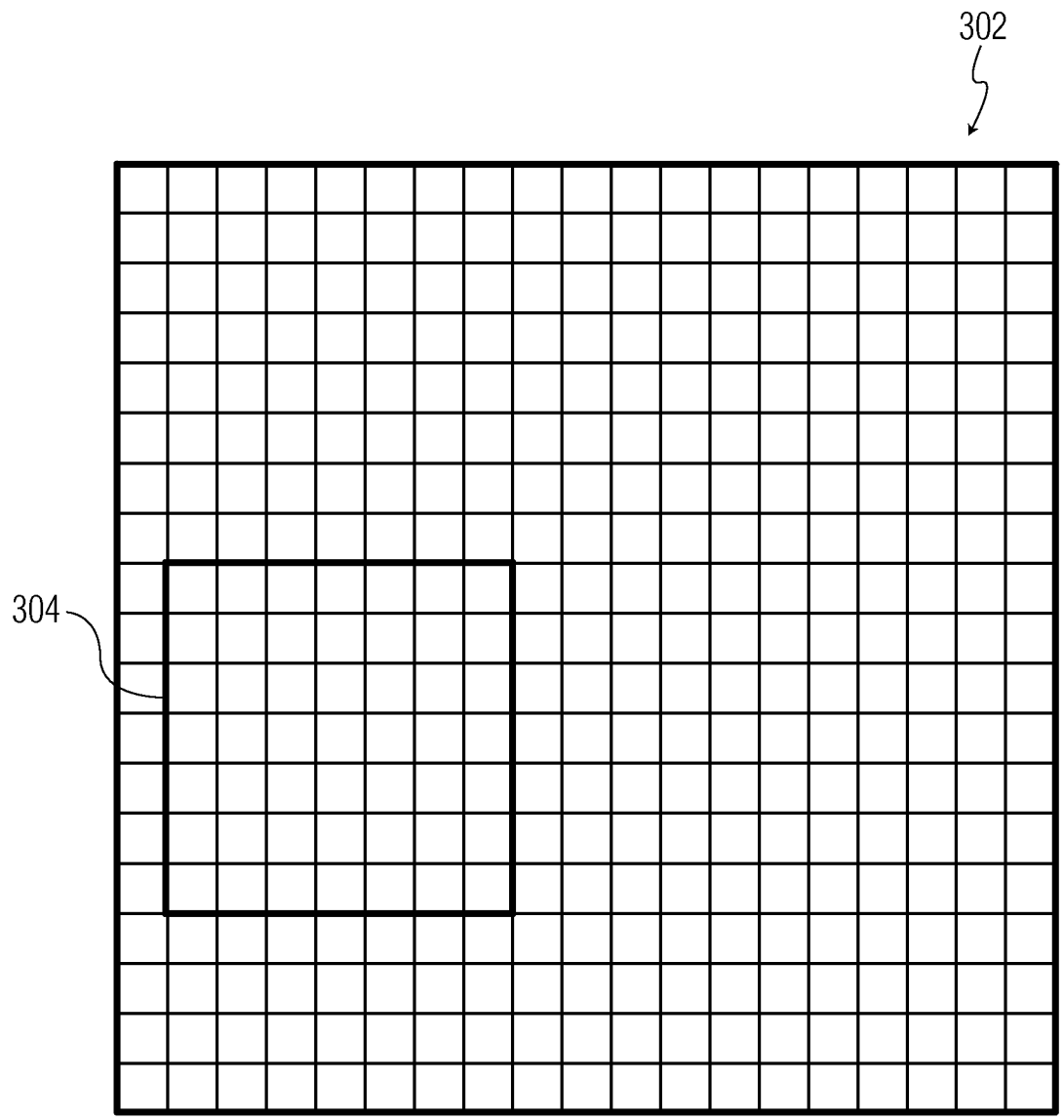
FIG. 3 is a diagram of an exemplary frame of image data of a navigation surface with a single portion of prominent trackable features in accordance with an embodiment of the invention.

The feature detector 222 operates to receive a frame of image data of the navigation surface 106 and then to analyze the frame of image data to select a portion of the frame of image data with prominent trackable features, if any. In some embodiments, the captured frames of image data are N×N pixel frames of image data and the portions with the prominent trackable features are M×M pixel portions, where M is less than N. An exemplary frame 302 of image data is shown in FIG. 3. In this example, the frame 302 of image data is a 19×19 pixel frame of image data. In operation, the feature detector 222 processes the frame 302 of image data to determine if the frame includes a portion of the frame of image data with prominent features or strong tracking features, such as a 7×7 pixel portion 304, which includes fewer pixels than the frame of image data. The feature detector 222 can make this determination based on contrast values between adjacent pixels of the frame 302 of image data but is not limited to this method. A contrast value between adjacent pixels is the intensity difference value between the adjacent pixels. Thus, in this example, the feature detector 222 will examine the contrast values between adjacent pixels in the portion 304. If these contrast values satisfies a predefined criterion, then the feature detector 222 will consider the portion 304 to be the portion with prominent trackable features. In an embodiment, the feature detector 222 will make the determination using a cumulative sum of contrast values for a target portion. That is, if the sum of contrast values for a target portion of a frame of image data exceeds a threshold value, and if no higher sums of contrast values are detected before the end of the frame of image data, the feature detector 222 will determine the target portion to be the portion with prominent trackable features. However, if a higher sum of contrast value for another portion of the frame of image data is detected, then that portion will be used as the portion with prominent trackable features. Thus, in the example of FIG. 3, if the sum of contrast values for the portion 304 of the frame 302 of image data exceeds a threshold value and is of the highest sum of contrast values for the frame of image data, the feature detector 222 will determine the portion 304 to be the portion with prominent trackable features.

In an embodiment, the feature detector 222 only selects a fixed size portion of a frame of image data. As an example, if the captured frames of image data of the navigation surface 106 are 19×19 pixel frames of image data, the feature detector 222 may select only 7×7 pixel portions of the frames of image data. In other embodiments, the feature detector 222 may select any appropriate size portion of a frame of image data from a range of sizes. As an example, if the captured frames of image data of the navigation surface 106 are 19×19 pixel frames of image data, the feature detector 222 may select 6×6, 7×7, 8×8 or 9×9 pixel regions of the frames of image data. If the feature detector 222 determines that a frame of image data does not have such a portion with prominent trackable features, then the processing unit 220 operates in the first mode of operation. However, if the feature detector 222 determines that a frame of image data does have such a portion with prominent trackable features, then the processing unit 220 operates in the second mode of operation, if enabled to do so.

The cross-correlator 224 operates to cross-correlate either full frames of image data of the navigation surface 106 or portions of the frames of image data. In the first mode of operation, i.e., when the feature detector 222 determines that a particular frame of image data does not have a predefined portion with prominent trackable features, the cross-correlator 224 cross-correlates that particular frame of image data with a previously captured frame of image data using the entire or full frames of image data. That is, the current frame of image data is cross-correlated with the previously captured frame of image data using every pixel of the particular frame of image data and every pixel of the previously captured frame of image data. In the second mode of operation, i.e., when the feature detector 222 determines that a particular frame of image data does have a predefined portion with prominent trackable features, the cross-correlator 224 cross-correlates the selected portion of that frame of image data with a corresponding portion of a previously captured frame of image data, rather than using the entire or full frames of image data. A corresponding portion of a frame of image data is the portion of the frame of image data having the same size as the selected portion with prominent trackable features and positioned in the same location in the frame of image data as the selected portion in the particular frame of image data. The results of the cross-correlation are then used to produce the output directional delta X and Y displacement values by the processing unit 220.

In the second mode of operation, the number of calculations needed to perform cross-correlation for displacement estimation will be greatly reduced. This is because the number of multiplications needed for a full frame cross-correlation is n to the fourth power ($n^4$), where n is the number of pixels along a single side of square frames of image data that are being cross-correlated. Using the example of 19×19 pixel frames of image data and 7×7 pixel portions of the frames of image data, the number of multiplications required for cross-correlation is reduced from 130,321 to 2,401, which is approximately an improvement by a factor of 54. In addition, since weak features in frames of image data do not significantly contribute to tracking using cross-correlation, the reduction in the number of multiplications required for cross-correlation can be achieved without significant tracking performance degradation because the weak features are most likely outside of the selected portion with prominent trackable features. The reduction in the number of multiplications required for cross-correlation can translate into reduced power consumption for the optical navigation system 100, assuming that the frame rate of the system is unchanged. Thus, the second mode of operation can be used to reduce the power consumption of the optical navigation system 100.

Instead of or in addition to reducing the power consumption, the second mode of operation can also be used to increase the tracking performance of the optical navigation system 100 during high speed usage. Usually, the number of multiplications required for cross-correlation is the bottleneck for frame rate increases. Thus, a reduction in the number of multiplications required for cross-correlation will directly enable the optical navigation system 100 to increase the frame rate, which will result in better tracking performance during higher speed usage.

Figure 4:
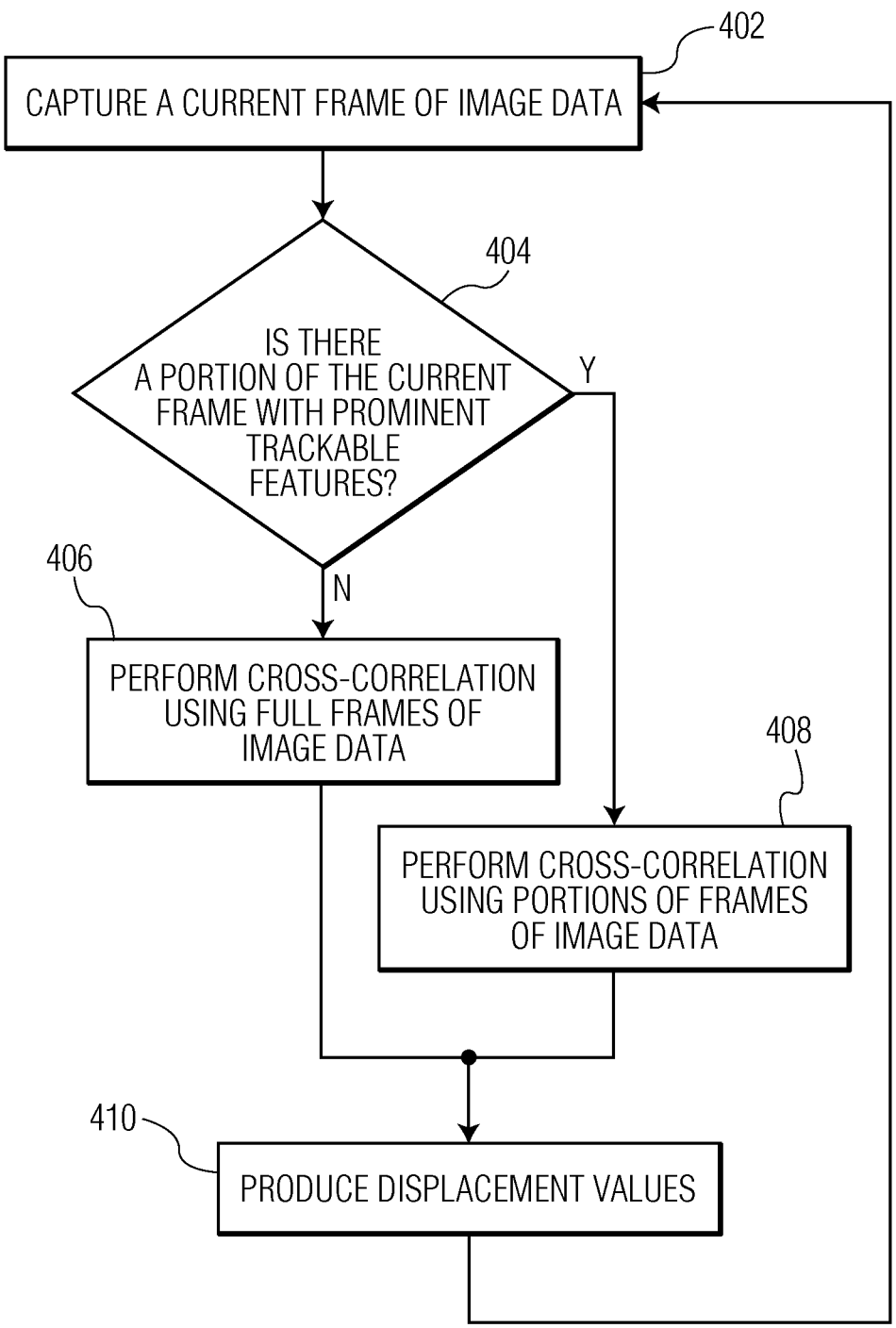
FIG. 4 is a process flow diagram of an operation of the optical navigation system in accordance with an embodiment of the invention.

The operation of the optical navigation system 100 in accordance with an embodiment of the invention is now described with reference to a process flow diagram of FIG. 4. In this embodiment, the second mode of operation is used to reduce the power consumption of the optical navigation system 100. Thus, in this embodiment, the frame rate of the optical navigation system 100 is not changed.

At block 402, a current frame of image data of the navigation surface 106 is captured. The process of capturing a frame of image data of the navigation surface 106 involves the driver circuit 216 applying a driving signal to the light source 216, which emits light in response to the applied driving signal toward the navigation surface 106. The image sensor 214 receives the light reflected from the navigation surface 106 and produces the frame of image data of the navigation surface from the received light.

Next, at block 404, a determination is made whether there is a portion of the current frame of image data with prominent trackable features. This determination is made by the feature detector 222 by analyzing the current frame of image data to detect trackable features in the current frame of image data. If there is no portion of the current frame of image data with trackable features, then the operation proceeds to block 406, where cross-correlation is performed on the current frame of image data with a previously captured frame of image data of the navigation surface 106 using full or entire frames of image data by the cross-correlator 224 in accordance with the first mode of operation.

However, if there is a portion of the current frame of image data with prominent trackable features, then the operation proceeds to block 408, where cross-correlation is performed on the portion of the current frame of image data with the corresponding portion of a previously captured frame of image data of the navigation surface 106 by the cross-correlator 224 in accordance with the second mode of operation.

After the cross-correlation, output directional delta X and Y displacement values are produced by the processing unit 220 using the results of the cross-correlation, at block 410. The operation then proceeds back to block 402, where the next frame of image data of the navigation surface 106 is captured. By using the second mode of operation when possible to reduce the number of calculations required for cross-correlation, the power consumption of the optical navigation system 100 can be significantly reduced.

Figure 5:
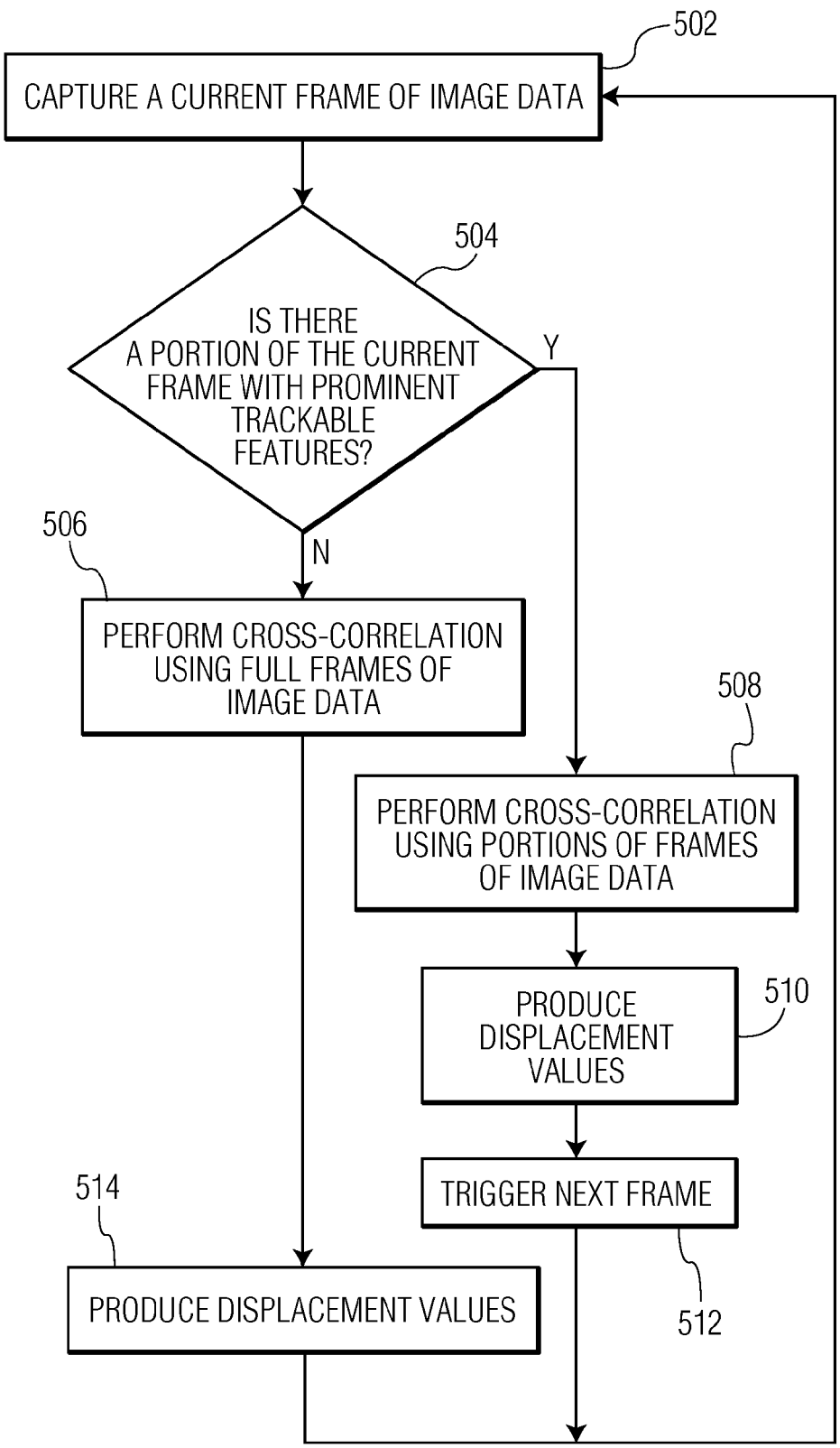
FIG. 5 is a process flow diagram of an operation of the optical navigation system in accordance with another embodiment of the invention.

The operation of the optical navigation system 100 in accordance with another embodiment of the invention is now described with reference to a process flow diagram of FIG. 5. In this embodiment, the second mode of operation is used to increase the tracking performance of the optical navigation system 100 at higher speed usage. Thus, in this embodiment, the frame rate of the optical navigation system 100 is increased using the second mode of operation so that the system can perform better at higher speeds.

At block 502, a current frame of image data of the navigation surface 106 is captured. Next, at block 504, a determination is made whether there is a portion of the current frame of image data with prominent trackable features. If there is no portion of the current frame of image data with prominent trackable features, then the operation proceeds to block 506, where cross-correlation is performed on the current frame of image data with a previously captured frame of image data of the navigation surface 106 using full frames of image data by the cross-correlator 224 in accordance with the first mode of operation. Next, at block 514, output directional delta X and Y displacement values are produced by the processing unit 220 using the results of the cross-correlation at block 506. The operation then proceeds back to block 502, where the next frame of image data of the navigation surface 106 is captured.

However, if there is a portion of the current frame of image data with prominent trackable features, then the operation proceeds to block 508, where cross-correlation is performed on the portion of the current frame of image data with the corresponding portion of a previously captured frame of image data of the navigation surface 106 by the cross-correlator 224 in accordance with the second mode of operation. Next, at block 510, output directional delta X and Y displacement values are produced by the processing unit 220 using the results of the cross-correlation at block 508. Next, at block 512, the next frame is triggered to capture another frame of image data. The operation then proceeds back to block 502, where the next frame of image data of the navigation surface 106 is captured. Since cross-correlation using portions of frames of image data is performed more quickly then cross-correlation using full frames of image data, the frame rate of the optical navigation system 100 can be increased using the second mode of operation. By increasing the frame rate of the optical navigation system 100, the tracking performance of the optical navigation system at higher speed usage can be improved.

Figure 6:
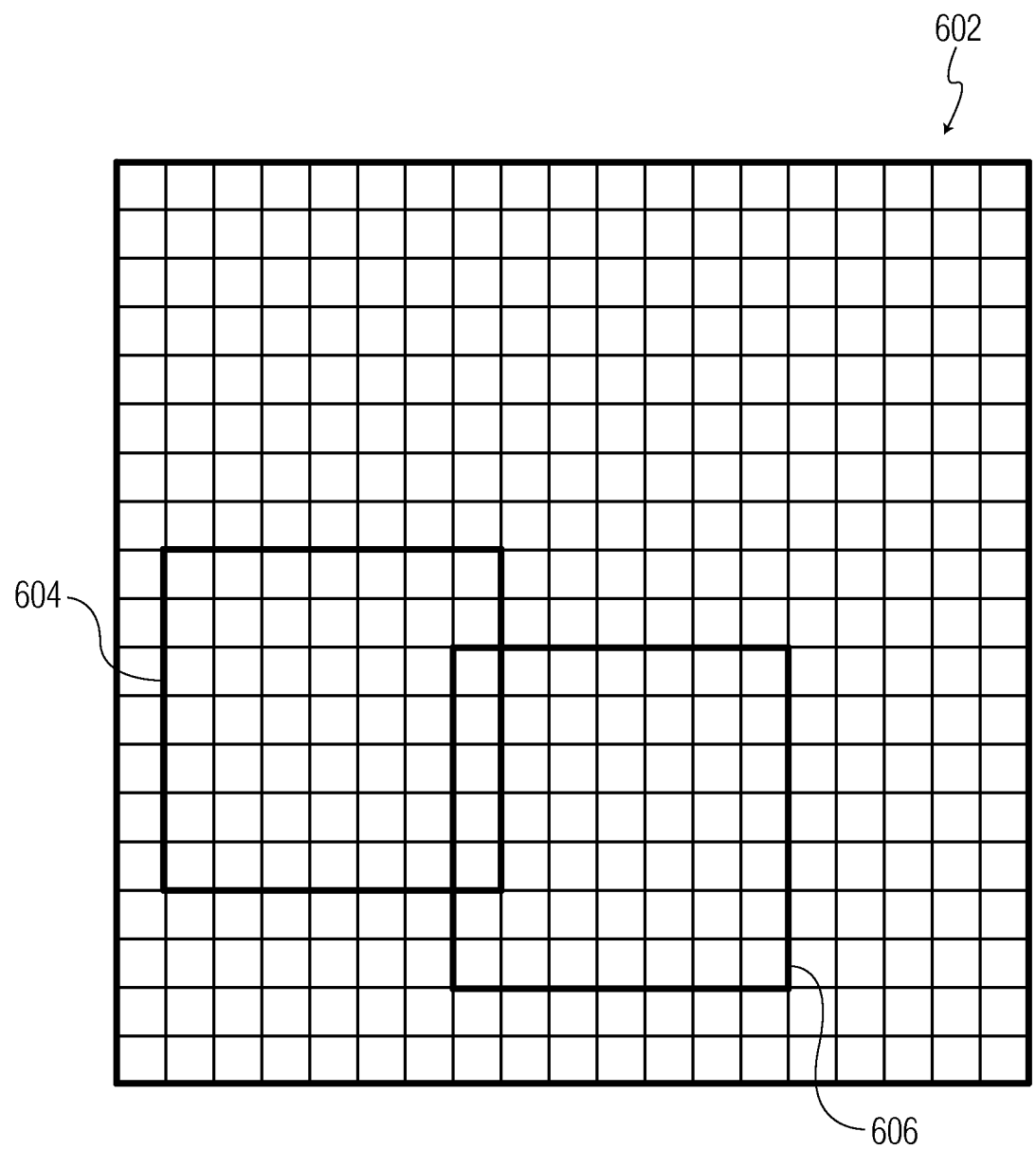
FIG. 6 is a diagram of an exemplary frame of image data of a navigation surface with two portions of prominent trackable features in accordance with an alternative embodiment of the invention.

In an alternative embodiment of the invention, the processing unit 220 is configured to select two portions of frames of image data for cross-correlation to increase the tracking accuracy of the optical navigation system 100. In this embodiment, the feature detector 222 is configured to select two appropriate portions of a frame of image data of the navigation surface 106 for cross-correlation. An exemplary frame 602 of image data having two portions 604 and 606 with prominent trackable features is shown in FIG. 6. As illustrated in FIG. 6, the two portions 604 and 606 may overlap each other in some situations. In other situations, the two portions 604 and 606 may not overlap each other. However, the two portions 604 and 606 should not both encapsulate the same features so that the two portions will be independently cross-correlated to increase tracking accuracy. In an embodiment, the feature detector 222 only selects fixed size portions of a frame of image data of the navigation surface 106. As an example, if the captured frames of image data of the navigation surface 106 are 19×19 pixel frames of image data, the feature detector 22 may select only two 7×7 pixel regions of the frames of image data. In other embodiments, the feature detector 222 selects any two appropriate size portions of a frame of image data from a range of sizes. As an example, if the captured frames of image data of the navigation surface 106 are 19×19 pixel frames of image data, the feature detector 22 may select two 6×6, 7×7, 8×8 or 9×9 pixel portions of the frames of image data. The selected two portions for each frame of image data may be of the same size or different sizes. If the feature detector 222 determines that a frame of image data does not have such portions with prominent trackable features, then the processing unit 220 operates in the first mode of operation. However, if the feature detector 222 determines that a frame of image data does have such portions with trackable features, then the processing unit 220 operates in the second mode of operation, if enabled to do so.

The cross-correlator 224 in this embodiment cross-correlates the two portions of the frame of image data with the corresponding portions of a previously captured frame of image data of the navigation surface 106 in the second mode of operation. However, the cross-correlator 224 still cross-correlates full frames of image data in the first mode of operation.

Figure 7:
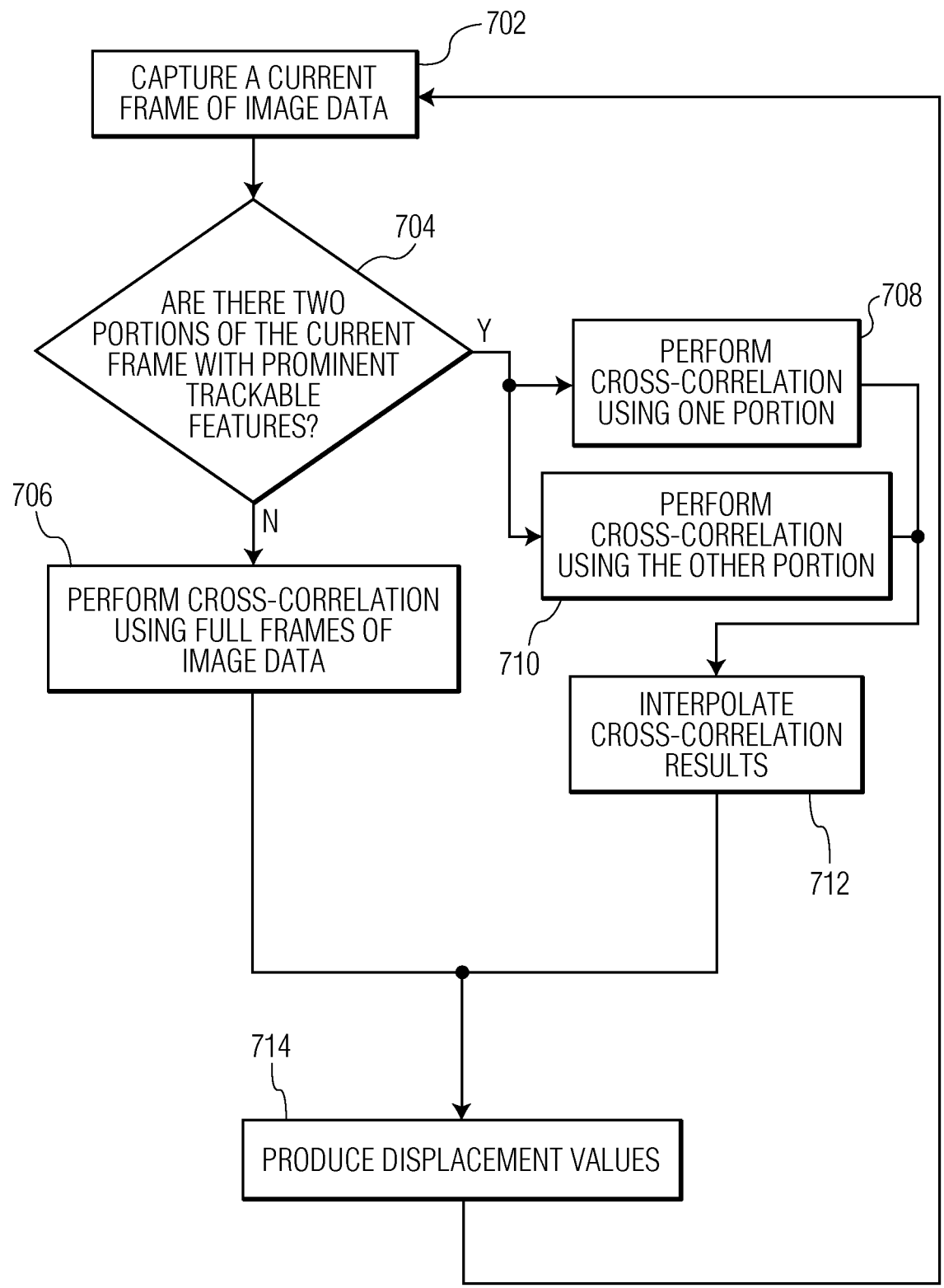
FIG. 7 is a process flow diagram of an operation of the optical navigation system in accordance with the alternative embodiment of the invention.

The operation of the optical navigation system 100 in accordance with the alternative embodiment of the invention is now described with reference to a process flow diagram of FIG. 7.

At block 702, a current frame of image data of the navigation surface 106 is captured. Next, at block 704, a determination is made whether there are two portions of the current frame of image data with prominent trackable features. If there are no two portions of the current frame of image data with prominent trackable features, then the operation proceeds to block 706, where cross-correlation is performed on the current frame of image data with a previously captured frame of image data of the navigation surface 106 using full frames of image data by the cross-correlator 224 in accordance with the first mode of operation. In other embodiments, if there is only one portion of image data with prominent trackable features, then this single portion of the current frame of image data with prominent trackable feature is used for tracking. In these embodiments, the full frames of image data are used for tracking only if there are no portions of current frame of image data with prominent trackable features.

However, if there are two portions of the current frame of image data with prominent trackable features, as long as the two portions do not encapsulate the same features, then the operation proceeds to blocks 708 and 710, which may be performed serially or in parallel. At block 708, cross-correlation is performed on one of the two portions of the current frame of image data with the corresponding portion of a previously captured frame of image data of the navigation surface 106 by the cross-correlator 224 in accordance with the second mode of operation. At block 710, cross-correlation is performed on the other portion of the current frame of image data and the corresponding portion of the previously captured frame of image data of the navigation surface 106 by the cross-correlator 224 in accordance with the second mode of operation. Next, at block 712, the results of the two cross-correlations are interpolated to produce interpolated cross-correlation results.

Next, at block 714, output directional delta X and Y displacement values are produced by the processing unit 220 using the results of the cross-correlation at block 706 or the interpolated cross-correlation results. The operation then proceeds back to block 702, where the next frame of image data of the navigation surface 106 is captured.

Although the above alternative embodiment has been described as using two portions of frames of image data, in other alternative embodiments, more than two portions of frames of image data may be used for displacement estimation. In addition, although the operations of the optical navigation system 100 in accordance with different embodiments have been described as correlating one or more portions of a current frame of image data with the corresponding portion(s) of a previously captured frame of image data, cross-correlations may be performed on one or more portions of the current frame of image data with the corresponding portion(s) of a subsequently captured frame of image data.

Figure 8:
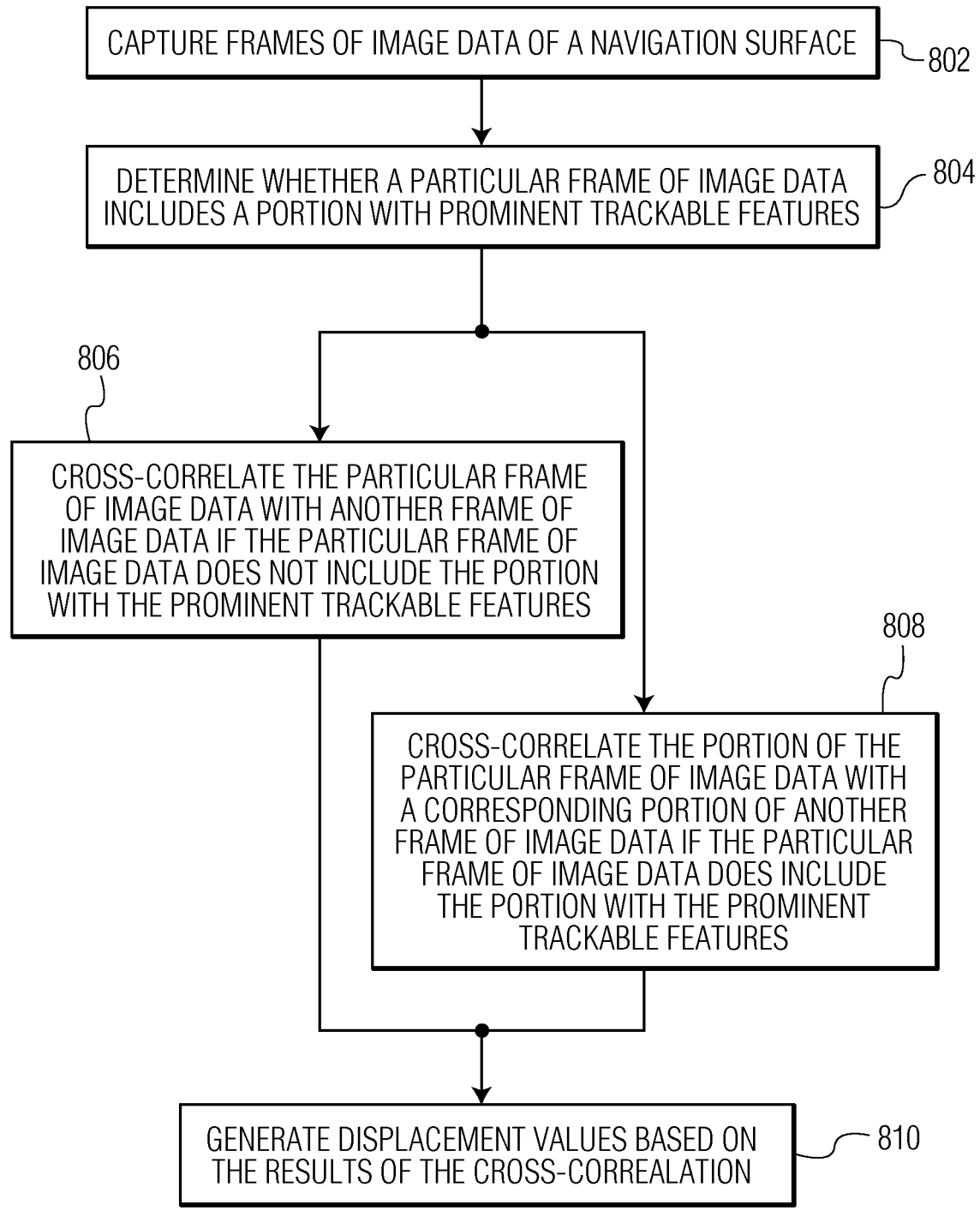
FIG. 8 is a process flow diagram of a method for performing optical navigation in accordance with an embodiment of the invention.

A method for performing optical navigation in accordance with an embodiment of the invention is described with reference to a flow diagram of FIG. 8. At block 802, frames of image data of a navigation surface are captured. Next, at block 804, a determination is made whether a particular frame of image data of the navigation surface includes a portion with prominent trackable feature. The portion of the particular frame of image data includes fewer pixels than the particular frame of image data. At block 806, if the particular frame of image data does not include the portion with the prominent trackable features, the particular frame of image data is cross-correlated with another frame of image data using every pixel of the particular frame of image data and the another frame of image data. At block 808, if the particular frame of image data does include the portion with the prominent trackable features, the portion of the particular frame of image data is cross-correlated with a corresponding portion of the another frame of image data. Next, at block 810, displacement values are generated based on the results of the cross-correlation at block 806 or the results of the cross-correlation at block 808.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for performing optical navigation comprising:
an image sensor having an array of photosensitive elements configured to capture frames of image data of a navigation surface;
a feature detector operably connected to the image sensor to receive a particular frame of image data of the navigation surface, the feature detector being configured to determine whether the particular frame of image data includes a portion with prominent trackable features, the portion of the particular frame of image data including fewer pixels than the particular frame of image data; and
a cross-correlator operably connected to the feature detector and the image sensor, the cross-correlator being configured to cross-correlate the particular frame of image data with another frame of image data using every pixel of the particular frame of image data and the another frame of image data if the feature detector determines that the particular frame of image data does not include the portion with the prominent trackable features, the cross-correlator being further configured to cross-correlate the portion of the particular frame of image data with a corresponding portion of the another frame of image data if the feature detector determines that the particular frame of image data does include the portion with the prominent trackable features, the corresponding portion of the another frame of image data including fewer pixels than the another frame of image data, the results of cross-correlation performed by the cross-correlator being used to estimate displacement with respect to the navigation surface,
wherein the feature detector is configured to determine whether the particular frame of image data includes a second portion with the prominent trackable features, and wherein the cross-correlator is configured to cross-correlator the second portion of the particular frame of image data with a corresponding second portion of the another frame of image data if the feature detector determines that the particular frame of image data includes the second portion with the prominent trackable features.

2. The system of claim 1 wherein the feature detector is configured to determine whether the particular frame of image data includes the portion with the prominent trackable features based on contrast values between adjacent pixels of the particular frame of image data.

3. The system of claim 2 wherein the feature detector is configured to determine whether a target portion of the particular frame of image data is the portion with the prominent trackable features using a cumulative sum of contrast values of the target portion, the target portion of the particular frame of image data being determined by the feature detector to be the portion with the prominent trackable features if the cumulative sum of contrast values of the target portion exceeds a threshold value and no other portion of the particular frame of image data has a higher cumulative sum of contrast values than the cumulative sum of contrast values of the target portion.

4. The system of claim 1 wherein the particular frame of image data is an N×N pixel frame of image data and the portion with the prominent trackable features is an M×M pixel portion, where M is less than N.

5. The system of claim 4 wherein the particular frame of image data is a 19×19 pixel frame of image data and the portion with the prominent trackable features is a 7×7 pixel portion.

6. The system of claim 1 wherein the cross-correlator is configured to interpolate the results of cross-correlation of the portion of the particular frame of image data with the corresponding portion of the another frame of image data with the results of cross-correlation of the second portion of the particular frame of image data with the corresponding second portion of the another frame of image data.

7. The system of claim 6 wherein the particular frame of image data is a 19×19 pixel frame of image data and the portion and the second portion with the prominent trackable features are 7×7 pixel portions.

8. A method for performing optical navigation, the method comprising:
    capturing frames of image data of a navigation surface;
    determining whether a particular frame of image data of the navigation surface includes a portion with prominent trackable features, the portion of the particular frame of image data including fewer pixels than the particular frame of image data;
    if the particular frame of image data does not include the portion with the prominent trackable features, cross-correlating the particular frame of image data with another frame of image data using every pixel of the particular frame of image data and the another frame of image data;
    if the particular frame of image data does include the portion with the prominent trackable features, cross-correlating the portion of the particular frame of image data with a corresponding portion of the another frame of image data, the corresponding portion of the another frame of image data including fewer pixels than the another frame of image data; and
    generating displacement values based on the results of the cross-correlating of the particular frame of image data with the another frame of image data or the cross-correlating of the portion of the particular frame of image data with the corresponding portion of the another frame of image data, the displacement values being an estimate of displacement with respect to the navigation surface,
    wherein the determining whether the particular frame of image data includes the portion with the prominent trackable features includes determining whether the particular frame of image data includes a second portion with the prominent trackable features, and wherein the cross-correlating the portion of the particular frame of image data with the corresponding portion of the another frame of image data includes cross-correlating the second portion of the particular frame of image data with a corresponding second portion of the another frame of image data.

9. The method of claim 8 wherein the determining whether the particular frame of image data includes the portion with the prominent trackable features includes determining whether the particular frame of image data includes the portion with the prominent trackable features based on contrast values between adjacent pixels of the particular frame of image data.

10. The method of claim 9 wherein the determining whether the particular frame of image data includes the portion with the prominent trackable features includes determining whether a target portion of the particular frame of image data is the portion with the prominent trackable features using a cumulative sum of contrast values of the target portion, the target portion of the particular frame of image data being determined to be the portion with the prominent trackable features if the cumulative sum of contrast values of the target portion exceeds a threshold value and no other portion of the particular frame of image data has a higher cumulative sum of contrast values than the cumulative sum of contrast values of the target portion.

11. The method of claim 8 wherein the particular frame of image data is an N×N pixel frame of image data and the portion with the prominent trackable features is an M×M pixel portion, where M is less than N.

12. The method of claim 11 wherein the particular frame of image data is a 19×19 pixel frame of image data and the portion with the prominent trackable features is a 7×7 pixel portion.

13. The method of claim 8 further comprising interpolating the results of cross-correlation of the portion of the particular frame of image data with the corresponding portion of the another frame of image data with the results of cross-correlation of the second portion of the particular frame of image data with the corresponding second portion of the another frame of image data.

14. The method of claim 13 wherein the particular frame of image data is a 19×19 pixel frame of image data and the portion and the second portion with the prominent trackable features are 7×7 pixel portions.

15. A method for performing optical navigation, the method comprising:
    capturing frames of image data of a navigation surface;
    determining whether a particular frame of image data of the navigation surface includes a portion with prominent trackable features, the particular frame of image data being an N×N pixel frame of image data and the portion of the particular frame of image data being an M×M pixel portion, where M is less than N;
    if the particular frame of image data does not include the portion with the prominent trackable features, cross-correlating the particular frame of image data with another frame of image data using every pixel of the particular frame of image data and the another frame of image data;
    if the particular frame of image data does include the portion with the prominent trackable features, cross-correlating the portion of the particular frame of image data with a corresponding portion of the another frame of image data, the corresponding portion of the another frame of image data including fewer pixels than the another frame of image data; and
    generating displacement values based on the results of the cross-corrleating of the particular frame of image data with the another frame of image data or the cross-correlating of the portion of the particular frame of image data with the corresponding portion of the another frame of image data, the displacement values being an estimate of displacement with respect to the navigation surface,
    wherein the determining whether the particular frame of image data includes the portion with the prominent trackable features includes determining whether the particular frame of image data includes a second portion with the prominent trackable features, and wherein the cross-correlating the portion of the particular frame of image data with the corresponding portion of the another frame of image data includes cross-correlating the second portion of the particular frame of image data with a corresponding second portion of the another frame of image data.

16. The method of claim 15 wherein the determining whether the particular frame of image data includes the portion with the prominent trackable features includes determining whether the particular frame of image data includes the portion with the prominent trackable features based on contrast values between adjacent pixels of the particular frame of image data.

17. The method of claim 16 wherein the determining whether the particular frame of image data includes the portion with the prominent trackable features includes determining whether a target portion of the particular frame of image data is the portion with the prominent trackable features using a cumulative sum of contrast values of the target portion, the target portion of the particular frame of image data being determined to be the portion with the prominent trackable features if the cumulative sum of contrast values of the target portion exceeds a threshold value and no other portion of the particular frame of image data has a higher cumulative sum of contrast values than the cumulative sum of contrast values of the target portion.

* * * * *